UNITED STATES PATENT OFFICE 2,141,858

VAT DYESTUFFS OF THE ANTHRAQUINONE SERIES

Donald P. Graham, South Milwaukee, Wis., assignor to E. I. du Pont de Nemours & Company, Wilmington, Del., a corporation of Delaware No Drawing. Application January 5, 1938, Serial No. 183,457

2 Claims. (Cl. 260—274)

This invention relates to the preparation of new vat dyestuffs of the anthraquinone series and more particularly to the preparation of those dyestuffs resulting from the caustic alkali fusion of the di(benzanthronyl-amino)-di(anthraquinonylamino) anthraquinones of the following general formula

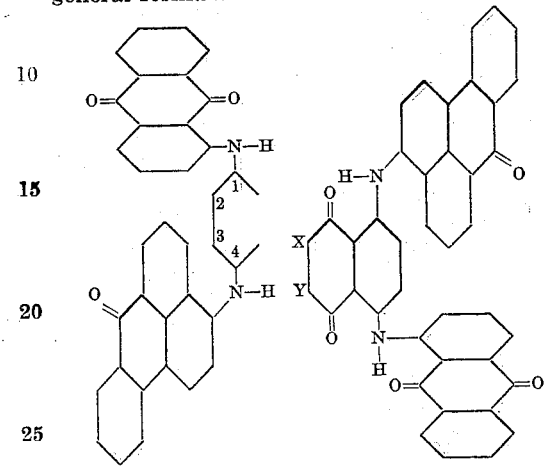

where the carbon atoms 1, 2, 3, 4, X and Y compose one benzene ring of the center anthraquinone nucleus.

The invention has for its object the preparation of new and valuable dyestuffs of the anthraquinone series which dye cotton in fast yellowish olive shades. The aluminum chloride fusion product of tetra-alpha-anthraquinonylaminoanthraquinone is known to give a dyestuff which dyes cotton in very greenish khaki shades of excellent fastness properties. Attempts have been made to obtain a dyestuff which would dye much yellower shades and still exhibit the same good fastness properties. I have now found that by the substitution of two Bz-1-aminobenzanthrone groups for the two anthraquinonyl radicals in either the 1,5- or 1,8-position of the center anthraquinone nucleus of the pentaanthrimide and subsequent treatment with an alkaline condensing agent that new and valuable dyestuffs are obtained which dye cotton in extremely yellowish olive shades of good fastness.

According to this invention the new dyestuff may be prepared by condensing 1,5-dibenzoylamino 4,8-dichloranthraquinone with two molecules of Bz-1-aminobenzanthrone, then hydrolyzing off the benzoyl groups in caustic alkali with simultaneous ring-closure of the acridine rings. The resulting diamino compound is then condensed with two molecules of 1-chloroanthraquinone and again subjected to the caustic fusion. The isomeric product in which the two benzanthronylamino radicals may be introduced in the 1 and 8 positions may be prepared by substituting the 1,8-dibenzoylamino-4,5-dichloroanthraquinone as the starting material in this process.

The following examples are given to illustrate the invention more fully. The parts used are by weight.

Example 1

80 parts of 1,5-di(benzoylamino)-4,8-dichloroanthraquinone are slurried in 800 parts of molten naphthalene with 80 parts of Bz-1-aminobenzanthrone, 40 parts of soda ash, 5 parts of copper acetate and 0.5 part of copper powder. The charge is heated to 212 to 215° C. and held for 15 hours. It is then cooled to 170° C. and diluted with 1000 parts of o-dichlorobenzene, cooled to 80° C., filtered, washed with o-dichlorobenzene, followed by alcohol and then by water, and dried. 30 parts of this dry intermediate are dissolved in a melt consisting of 300 parts of KOH and 350 parts of ethyl alcohol. The melt is heated to 140° C., allowing some alcohol to escape, and held at 135 to 145° C. for 2 hours. It is then drowned in 2000 parts of cold water and oxidized by the addition of 10 parts of nitrobenzene-meta-sodium sulfonate or by aeration. The product is filtered off, washed alkali-free, and dried. 23 parts of this intermediate are slurried in 300 parts of molten naphthalene with 19 parts of 1-chloroanthraquinone, 20 parts of soda ash, 2 parts of copper acetate, and 0.2 part of copper powder. The charge is heated to 212 to 215° C. for 15 hours, cooled to 170° C., diluted with 400 parts of o-dichlorobenzene, cooled to 80° C., filtered, washed with o-dichlorobenzene, followed by alcohol and water and dried.

15 parts of this dried product are dissolved in a melt comprising 225 parts of KOH and 225 parts of ethyl alcohol, heated to 155° C. (allowing some alcohol to distill off) and refluxed at 150 to 155° C. for 1 hour. It is then drowned in 2000 parts of water, oxidized with 10 parts of nitrobenzene-meta-sodium sulfonate (or by aeration), and the crude color filtered off and dried.

The product is acid pasted by dissolving 1 part of the dry crude color in 20 parts of 93% $H_2SO_4$. This mass is drowned in water, filtered, washed acid free and dried or milled up as a smooth aqueous paste.

The product (when dried) is an olive to black solid dissolving in 95% $H_2SO_4$ with a violet color and dyeing cotton in fast yellow olive shades from an olive colored vat.

Example 2

If 1,8-di(benzoylamino)-4,5-dichloroanthraquinone is substituted for 1,5-di(benzoylamino)-4,8-dichloroanthraquinone as the starting intermediate in the preceding example, an isomeric dyestuff is obtained which also gives a violet solution in 95% sulfuric acid and an olive vat. It dyes cotton in yellow-olive shades.

As an alternative procedure to that given in the specific example above, the condensation product of the 1,5-dibenzoylamino-4,8-dichloroanthraquinone with the two moles of Bz-1-aminobenzanthrone may be hydrolyzed with sulfuric acid in place of caustic, and after the introduction of the two moles of 1-chloroanthraquinone the above product may be subjected to caustic alkali fusion to effect a ring-closure. This procedure is found to give a product identical to that described in Example 1. This same procedure may be employed in the preparation of the 1,8-dibenzanthronylaminoanthraquinone compound. In all cases the resulting products dye cotton in bright yellow-olive shades of good fastness properties.

While it is generally believed that the alkaline condensation of the dibenzanthronylaminoanthraquinone effects the ring-closure of the anthrimide group to the acridine through the 2 position of benzanthrone molecule, it has not been definitely established that ring-closure of the two anthraquinonylaminoanthraquinone groups takes place, although this is believed to be the case for apparently some type of ring-closure is effected. It has not been definitely determined however whether an acridine or a carbazole ring is formed, or whether both anthrimide groups are converted to heterocyclic rings.

I claim:

1. The dyestuffs resulting from the caustic alkali condensation of the products of the following general formula

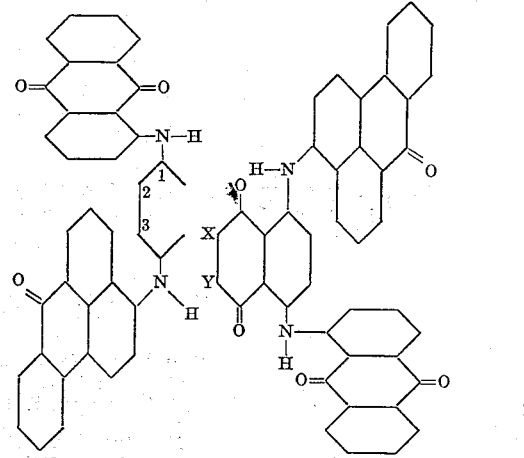

where the carbon atoms 1, 2, 3, 4, X and Y compose one benzene ring of the center anthraquinone nucleus, which dye cotton in yellow-olive shades of good fastness properties.

2. The dyestuff resulting from the caustic alkali condensation of the product of the following formula

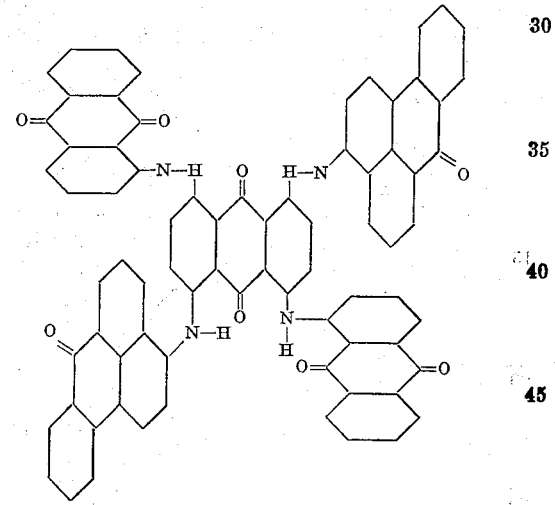

which dyes cotton in yellow-olive shades of good fastness properties.

DONALD P. GRAHAM.

Certificate of Correction

Patent No. 2,141,858.   December 27, 1938.

DONALD P. GRAHAM

It is hereby certified that errors appear in the printed specification of the above numbered patent requiring correction as follows: Page 2, second column, lines 4 to 22 inclusive, claim 1, strike out the formula and insert instead the following:

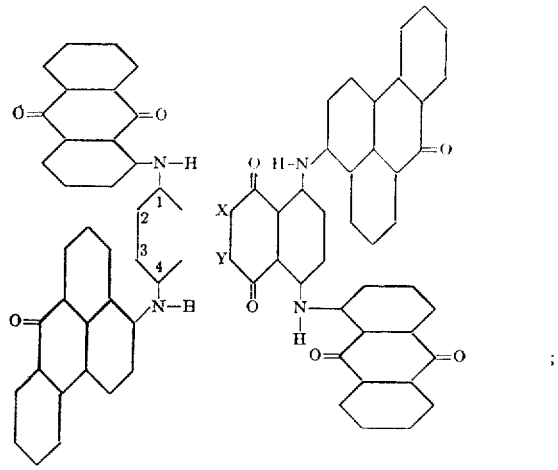

lines 29 to 49 inclusive, claim 2, strike out the formula and insert instead the following:

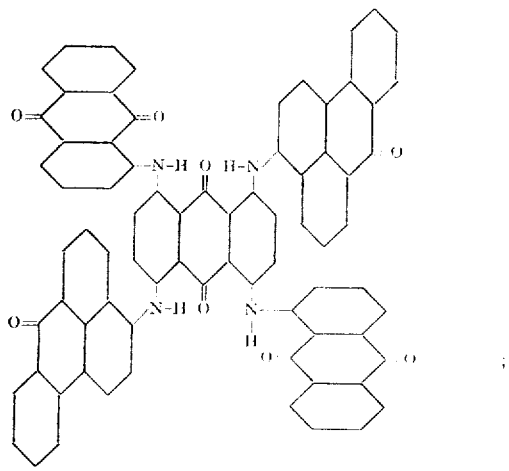

and that the said Letters Patent should be read with these corrections therein that the same may conform to the record of the case in the Patent Office.

Signed and sealed this 21st day of February, A. D. 1939.

[SEAL]

Henry Van Arsdale.
*Acting Commissioner of Patents.*